United States Patent [19]

Laflin et al.

[11] Patent Number: 5,238,273

[45] Date of Patent: Aug. 24, 1993

[54] APPARATUS FOR INTERNALLY CONNECTING TO COILED TUBING

[75] Inventors: Walter J. Laflin, Houston; Brian K. Moore, Humble, both of Tex.

[73] Assignee: Camco International Inc., Houston, Tex.

[21] Appl. No.: 988,089

[22] Filed: Dec. 9, 1992

Related U.S. Application Data

[63] Continuation of Ser. No. 744,152, Aug. 13, 1991, abandoned.

[51] Int. Cl.$^5$ ............................................. F16L 55/00
[52] U.S. Cl. ................................... 285/119; 285/175; 285/323; 285/370
[58] Field of Search ............... 285/322, 323, 370, 397, 285/258, 421, 55, 286, 175, 119; 294/86.14, 86.22, 86.24, 86.25, 94, 96

[56] References Cited

U.S. PATENT DOCUMENTS

| | | | |
|---|---|---|---|
| 1,653,547 | 12/1927 | Cameron | 294/96 X |
| 1,819,652 | 8/1931 | Metcalf | 285/323 |
| 1,821,328 | 9/1931 | Segelhorst | 285/175 |
| 3,638,969 | 2/1972 | Serrano | 285/370 X |
| 3,742,582 | 7/1973 | Broske | 285/370 X |
| 3,876,233 | 4/1975 | Schmedding et al. | 285/370 X |
| 3,993,334 | 11/1976 | Fridman et al. | 285/370 X |
| 4,682,657 | 7/1987 | Crawford | 166/385 |
| 4,813,717 | 3/1989 | Watts | 285/397 X |
| 4,844,166 | 7/1989 | Going, III et al. | 166/379 |

Primary Examiner—Dave W. Arola
Attorney, Agent, or Firm—Fulbright & Jaworski

[57] ABSTRACT

An internal slip-type connector for coupling coiled tubing to tools or other coiled tubing having a body that does not upset the outside diameter of the coiled tubing with seal means to seal to the inside of the coiled tubing. A mandrel is threadably engaged to the inside of the end of the body and slip means abuts the first end of the body and engages the mandrel. Rotation of the body relative to the mandrel wedges the slip means into the inside of the coiled tubing for gripping.

12 Claims, 3 Drawing Sheets

FIG.1A
FIG.1B
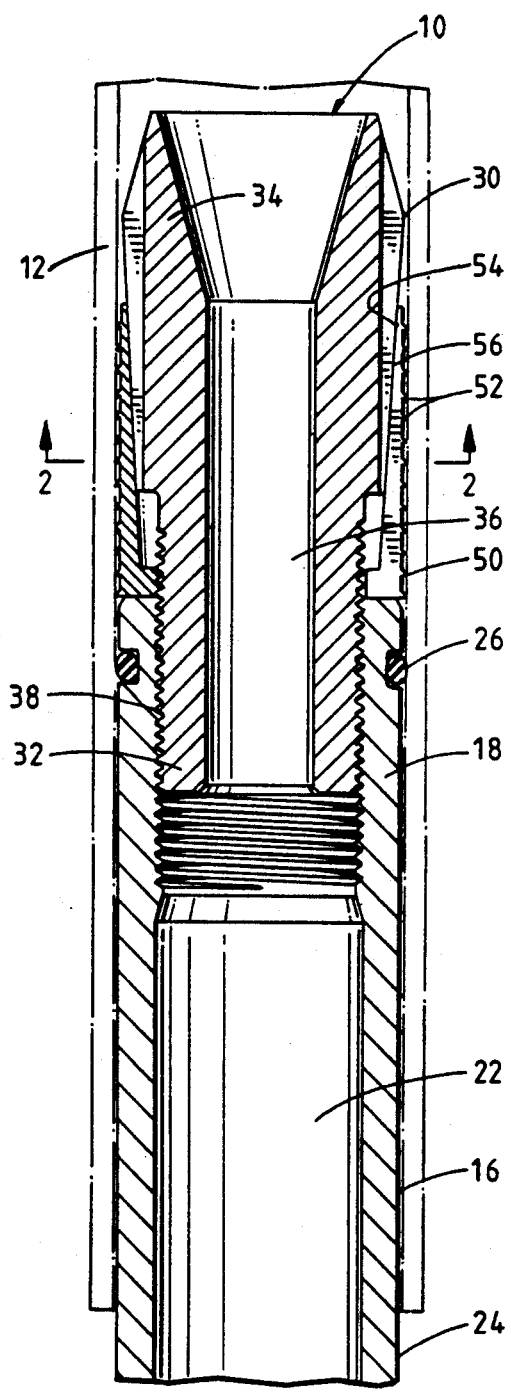
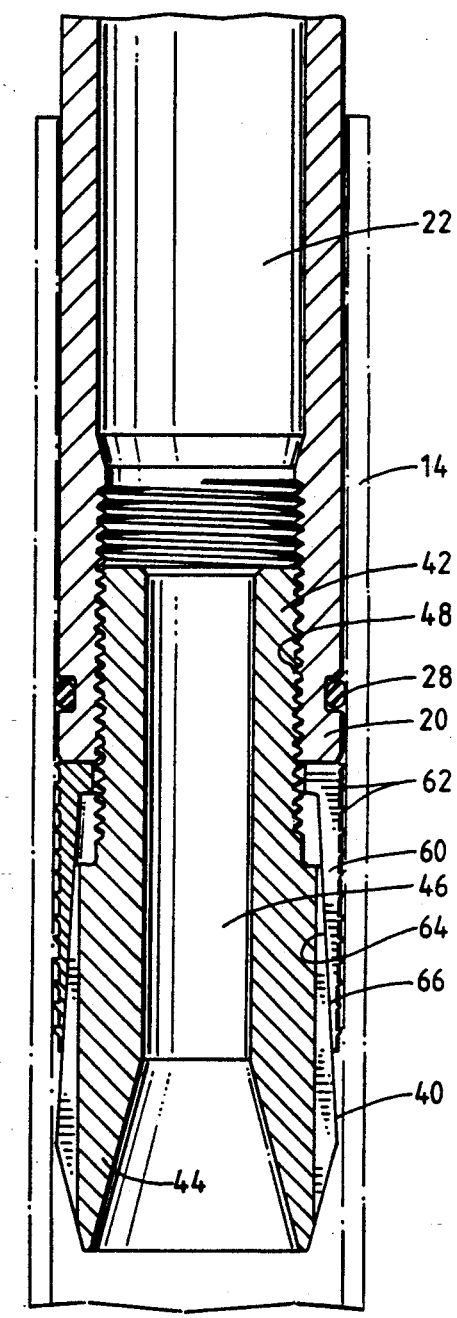

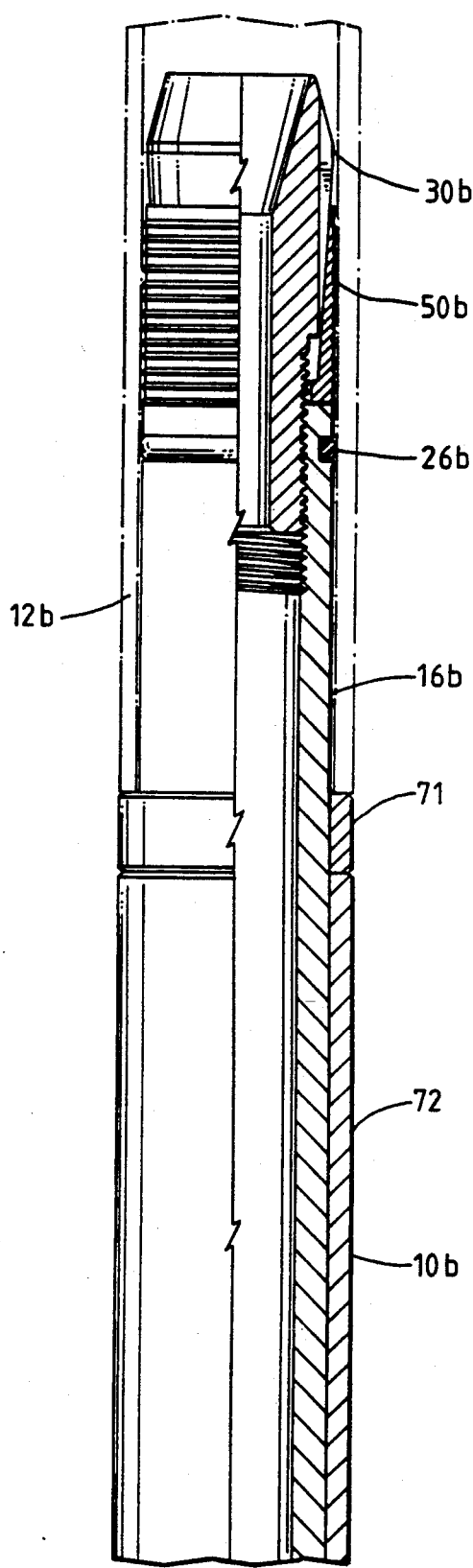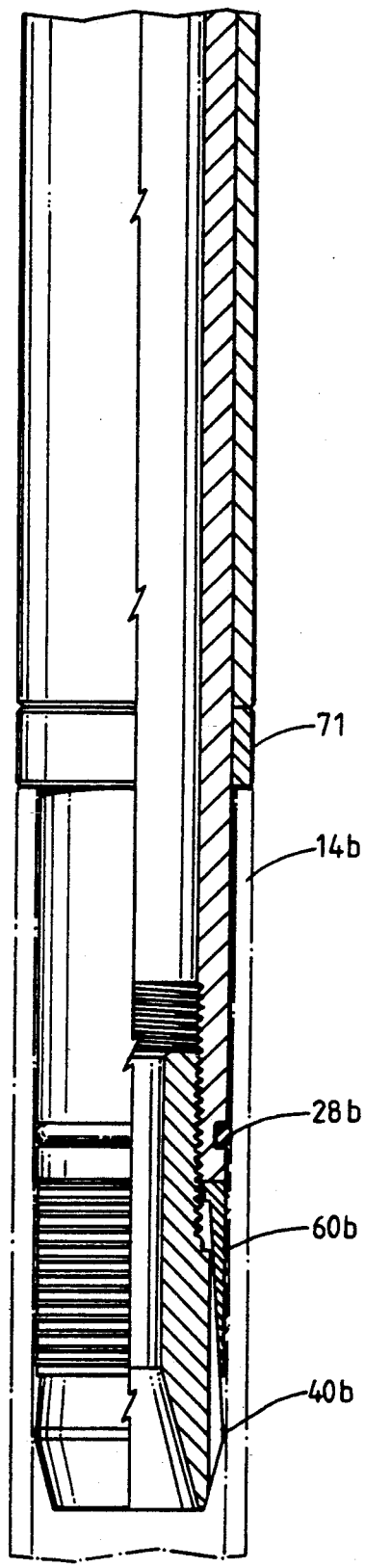
FIG.4A  FIG.4B

APPARATUS FOR INTERNALLY CONNECTING TO COILED TUBING

CROSS REFERENCE TO RELATED APPLICATION

This application is a continuation of patent application Ser. No. 07/744,152, filed Aug. 13, 1991, entitled "Method and Apparatus for Internally Connecting to Coiled Tubing" and now abandoned.

BACKGROUND OF THE INVENTION

The present invention is directed to connecting lengths of well coil tubing or connecting well tools to coiled tubing.

Coiled tubing is a continuous conduit without joints used in an oil and/or gas well carried on a reel at the well surface. The coiled tubing can be lowered into an oil and/or gas well and is of a small diameter, such as one to two inches. Coiled tubing may be used for injecting well fluids into well tubing, sand washing, removal of liquids from the wells, producing wells through the tubing, or for installing and operating a variety of well accessories, such as disclosed in U.S. Pat. No. 4,844,166.

Interconnection of the coiled tubing with other lengths of coiled tubing and well tools has been accomplished in the past, as described in U.S. Pat. No. 4,682,657, by providing a connector gripping the exterior of the coiled tubing. However, such connectors inherently provide an outside diameter which is greater than the outside diameter of the coiled tubing. This provides difficulty in allowing the coiled tubing and connector to sealingly pass through pack-offs and other well control equipment and pass freely through the coiled tubing injector chains, around goosenecks, and onto the coiled tubing spool as the coiled tubing is inserted and removed from a well conduit.

The present invention is directed to a method and apparatus which internally grips and connects to the coiled tubing and avoids the disadvantages of the prior art connectors by being spoolable, will sealably pass through pack-offs, and has an outer body sized no greater than the outside diameter of the coiled tubing.

SUMMARY

The present invention is directed to a well connector connectable to the inside of one end of well coiled tubing for coupling the coiled tubing to another member. The connector includes a circular body having first and second ends and a bore therethrough and an outside diameter of a size no greater than the outside diameter of the coiled tubing. The first end of the body has an outside diameter substantially equal to the inside diameter of the coiled tubing, and seal means are provided on the first end for sealing between the first end and the inside of the one end of the coiled tubing. A mandrel having first and second ends and having a bore therethrough is provided in which the first end of the mandrel threadably engages the inside of the first end of the body. Slip means abut the first end of the body and engage the outside of the mandrel and the slip means include a plurality of outwardly directed teeth for engaging the inside of the coiled tubing. Coacting wedge surfaces on the inside of the slip means and the outside of the mandrel are provided for wedging the slip means into the inside of the coiled tubing when the body is rotated relative to the mandrel.

A further object is the provision of a well connection connectable to the inside of one end of two well coiled tubings for coupling a first coiled tubing to a second coiled tubing. The connection includes a circular body having first and second ends and a base therethrough and an outside diameter of a size no greater than the outside diameter of the coiled tubing. The first and second ends each have an outside diameter substantially equal to the inside diameter of the first and second coiled tubing, respectively. Seal means are provided on the first end of the body and on the second end of the body for sealing between the first end of the body and the inside of the one end of the coiled tubing and sealing between the second end of the body and the inside of the one end of the second coiled tubing. Threaded engaging means on the first and second ends of the body are provided for connecting the first and second ends of the body to the inside of the one end of the first coiled tubing and to the inside of the one end of the second coiled tubing, respectively. The threaded engaging means on the first end are oppositely directed to the threaded engaging means on the second end.

Still a further object of the present invention is wherein the slip means and the mandrel each includes a longitudinally extending groove for receiving a weld on the coiled tubing.

Still a further object of the present invention is the provision of a well connector connectable to the inside of one end of two well coiled tubing for coupling a first coiled tubing to a second coiled tubing. A circular body is provided having first and second ends and having a bore therethrough and an outside diameter of a size no greater than the outside diameter of the coiled tubing. The first end of the body and the second end of the body each have an outside diameter substantially equal to the inside diameter of the first and second coiled tubing, respectively. Seal means on the first end and on the second end of the body are provided for sealing between the first end of the body and the inside of one end of the first coiled tubing and sealing between the second end of the body and the inside of the one end of the second coiled tubing, respectively. First and second mandrels are provided each having first and second ends and each having a bore therethrough. The first end of the first mandrel is threadably engaged to the inside of the first end of the body and the first end of the second mandrel is threadably engaged to the inside of the second end of the body. The threadable engagement of the first mandrel and the body are oppositely directed to the threadable engagement of the second body with the second end of the body whereby rotation of the body relative to the first and second mandrels will simultaneously move both mandrels but in different directions. First slip means are provided abutting the first end of the body and engaging the outside of the first mandrel and include a plurality of outwardly directed teeth for engaging the inside of the first coiled tubing. Second slip means are provided abutting the second end of the body and engaging the outside of the second mandrel. The second slip means include a plurality of outwardly directed teeth for engaging the inside of the second coiled tubing. First coacting wedge surfaces on the inside of the first slip means and the outside of the first mandrel are provided for wedging the first slip means into the inside of the first coiled tubing when the body is rotated relative to the first mandrel. Second coacting wedge surfaces on the inside of the second slip means and the outside of the second mandrel are provided for wedging the second slip means into the inside of the second coiled tubing when the body is rotated to the second mandrel.

Still another object is wherein the first and second slip means and the first and second mandrel each include a longitudinally extending groove for receiving a longitudinally extending weld on the coiled tubing.

Still a further object is wherein the first seal means is positioned on the first end of the body and the second seal means is positioned on the second end of the body for allowing the body to be thinner, more flexible for replacement on a reel.

Still a present object of the present invention is wherein the body includes a metal reduced outer diameter between the first and second seal means for providing greater flexibility.

Yet a further object of the present invenion is a method of coupling one end of a first and second coiled tubing together by inserting first and second threaded engaging means positioned on opposite ends of a body, respectively, into the inside of one end of the first and second coiled tubing, respectively. One of the threaded engaging means includes a right-handed thread and the other includes a left-handed thread. The method includes rotating the body for connecting the one end of the first and second coiled tubing to opposite ends of the body, respectively.

Still a further object of the present invention is the method of coupling one end of a first and second coiled tubing together which includes removing a portion of the weld in the ends of the first and second coiled tubing, inserting first and second slip means positioned on first and second wedge mandrels, respectively, into the inside of one end of the first and second coiled tubing, respectively. The method further includes rotating a body threadably connected to the first and second mandrels by a right-handed threaded connection and a left-handed threaded connection, respectively, for simultaneously gripping the inside of the first and second coiled tubing. The method may also include longitudinally extending grooves in the first and second slip means and said first and second mandrels which are first aligned with longitudinally extending welds in the first and second coiled tubing, respectively, when inserting the first and second slip means.

Yet a further object is wherein the metal body has an outer diameter equal to the inside of the coiled tubing for being flexible, and includes an outer plastic coating having an outside diameter equal to the outside diameter of the coiled tubing for sealing through pack-offs and other well control equipment.

Other and further objects, features and advantages will be apparent from the following description of presently preferred embodiments of the invention, given for the purpose of disclosure, and taken in conjunction with the accompanying drawings.

BRIEF DESCRIPTION OF THE DRAWINGS

FIGS. 1A and 1B are continuations of each other and form an elevational view, in cross section, of one embodiment of the present invention.

DESCRIPTION OF THE PREFERRED EMBODIMENT

Figure 3:
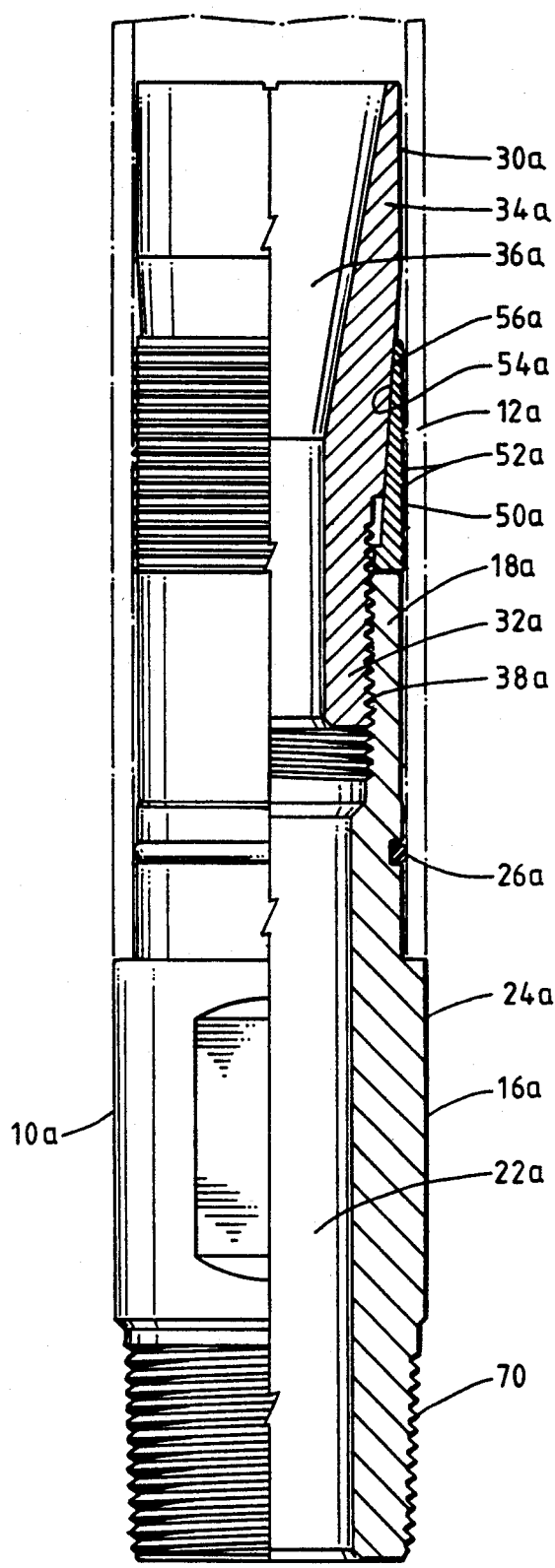
FIG. 3 is an elevational view, in quarter section, of another embodiment of the present invention, and FIGS. 4A and 4B continuations of each other and form an elevational view, in quarter section, of another embodiment.

Referring now to the drawings, and particularly to FIGS. 1A and 1B, the reference numeral 10 generally indicates the metal well connector of the present invention connected to the inside of one end of first and second well coiled tubing 12 and 14, shown in dotted outline. The connector 10 includes a circular metal body 16 having a first end 18 and a second end 20 and having a bore 22 therethrough for the passage of fluids. The body 16 has an outside diameter 24 of a size no greater than the outside diameter of the coiled tubing 12 and 14. Therefore, the body 16 does not upset or protrude past the outside diameter of the coiled tubing 12 and 14 and thus passes freely through coiled tubing injector chains, around goosenecks, and onto a coiled tubing spool (not shown). The first end 18 of the body 16 and the second end 20 of the body 16 have an outside diameter substantially equal to the inside diameter of the first and second coiled tubing 12 and 14, respectively.

Seal means, such as O-ring seals 26 and 28, are provided on the first end 18 of the body 16 and also on the second end 20 of the body 16, respectively, for sealing between the first end 18 and the inside of the first coiled tubing 12, and for sealing between the second end 20 of the body 16 and the inside of the second coiled tubing 14, respectively. In the embodiment shown in FIGS. 1A and 1B, the outside diameter of the body 16 is substantially equal to the inside diameter of the coiled tubing 12 and 14. This allows the body to be thin and flexible so as to be spoolable on a reel. The O-rings 26 and 28, since they reduce and weaken the strength of the body, are placed at the ends of the body so as to be less subject to bending and breakage of the body 10 when the connector 16 is spooled on a reel.

A first mandrel 30 having a first end 32 and a second end 34 is provided having a bore 36 therethrough in communication with the bore 22. The first end 32 of the first mandrel 30 threadably engages the inside of the first end 18 of the body 16 by a threadable connection 38. A second mandrel 40 includes a first end 42 and a second end 44 with a bore 46 therebetween in communication with the bore 22. The first end 42 of the mandrel 40 threadably engages the second end 20 of the body 16 by a threaded connection 48. One of the threaded connections is a right-handed threaded connection and the other threaded connection is a left-handed threadable connection. Therefore, rotation of the body 16 in one direction will move the mandrels 30 and 40 towards each other and movement in the opposite direction of the body 16 will move the mandrels 30 and 40 away from each other.

First slip means 50 abuts the first end 18 of the body 16 and also engages the outside of the first mandrel 30. The slip means 50 includes a plurality of outwardly directed teeth 52 which are directed towards the end of the first coiled tubing 12. A second slip means 60 is provided abutting the second end 20 of the body 16 and engages the outside of the second mandrel 40. The second slip means 60 includes a plurality of outwardly directed teeth 62 directed towards the end of the coiled tubing 14.

Coacting wedge surfaces are provided on the inside of the first slip means 50 and the outside of the first mandrel 30 such as wedge surface 54 on the slip 50 and wedge surface 56 on the outside of the mandrel 30. The wedge surfaces 54 and 56 wedge the first slip 50 into the inside of the first coiled tubing 12 when the body 16 is rotated relative to the first mandrel 30. Similarly, second coacting wedge surfaces are provided on the inside of the second slip means 60 and the outside of the second mandrel 40 such as wedge surface 64 on the inside of the slip means 60 and wedge surface 66 on the outside of the mandrel 40 for wedging the second slip means 60 into the inside of the second coiled tubing 14 when the body 16 is rotated relative to the second mandrel 40.

Figure 2:
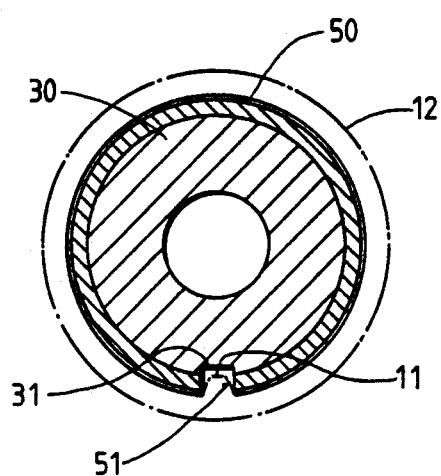
FIG. 2 is a cross-sectional view taken along the line 2—2 of FIG. 1A.

Referring now to FIG. 2 it is to be noted that coiled tubing 12 includes a conventional longitudinal weld 11 running the length of the tubing as a result of its manufacture. Preferably, this weld flash 11 adjacent the end of the coiled tubing 12 is removed to allow the connector body 16 to be inserted into the end of the coiled tubing and rotated. However, the slip means 50 and 60 each includes a longitudinal groove such as 51 at one circumferential location to clear the weld flash 11 inside the coiled tubing. The longitudinal grooves 51 also allow the slip means 50 and 60 to be circumferentially compressed outwardly insuring a snug grip on the coiled tubing inside surface during connection of the connector 10. The mandrels 30 and 40 also include longitudinal grooves such as 31 along their length to clear the weld flash 11 inside the coiled tubing.

Another problem with connectors is that they are required to be coiled around a coiled tubing spool when the coiled tubing is retrieved to the well surface. In order to have some amount of flexibility, but still maintain the necessary strength, the seal means 26 and 28 are preferably positioned near the outer ends of the first end 18 and the second end 20, respectively, such as adjacent the threaded connections wherein their grooves will not unduly weaken the body 16. In addition, the outer diameter 24 of the body 16 may be slightly reduced in diameter such as, for example only, for a connector for use on a two-inch coiled tubing of 0.014 inches, which will allow the middle part of the body 16 to be more plastic and bend.

In use, the longitudinal weld flash 11 in the first 12 and second 14 coiled tubing ends is removed to a distance so that it will not interfere with the connector body 16. Secondly, the longitudinal grooves 31 on the mandrels 30 and 40 and the grooves 51 in the slip means 50 and 60 are aligned with the weld flashings 11 in the ends of the coiled tubing 12 and 14, respectively. After installing the ends of the connector 10 into the ends of the coiled tubing 12 and 14, leaving a space between the ends of the coiled tubing 12 and 14 for external engagement of the body 16, the connector body 16 is then rotated using a tool such as a chain wrench or strap wrench. Rotation of the body 16 in the proper direction causes the mandrels 30 and 40 to be moved towards each other simultaneously and the left-handed and right-handed threaded connections allow the slips 50 and 60 to be tightened simultaneously as the mandrels 30 and 40 wedge the slip means 50 and 60 outwardly into the inside surface of the coiled tubing 12 and 14, respectively. This drives the teeth 52 and 62 into the inside of the coiled tubing 12 and 14 and maintains their interconnection.

Other and further embodiments of the invention may be provided. A further embodiment is shown in FIG. 3 and FIGS. 4A and 4B wherein like parts to those shown in FIGS. 1A, 1B and 2 are similarly numbered with the addition of the suffixes "a" and "b". The connector 10a is to connect a suitable well tool (not shown) to one end of the coiled tubing 12a. Therefore, the connector 10a uses only one mandrel 30a and one slip means 50a and a suitable connection 70 such as a thread is connected to the bottom end of the connector 10a for connection to a well tool. In this case, it is noted that the outer circumference 24a extends outwardly further than the circumference 24 of the first embodiment, but still does not extend out beyond the outer diameter of the coiled tubing 12a. The installation and operation is similar to the first embodiment, but is only installed in one end of a coiled tubing 12 and a suitable tool is connected to the threaded connection 70. In the embodiment of FIG. 3, the connector 10a is shorter than the connector 10 and thus need not be flexible for bending around a reel. Therefore, the outer diameter of the body 16a may be equal to the outer diameter of the coiled tubing 12a for providing a smooth exterior for sealingly passing freely through pack-off and other well control equipment and through coiled tubing injector chains, and around goosenecks.

Referring now to FIGS. 4A and 4B, another embodiment 10b is shown for coupling coiled tubing 12b and 14b together which has the advantages of (1) having an outside diameter which is substantially equal to the outside diameter of the coiled tubing 12b and 14b for sealing through a well pack-off and other control equipment and to enable the injector chains to uniformly grip the connector 10b, and (2) allow the connector to bend and be spooled up on a reel. Thus, a metal body 16b provided similar to body 16 in FIG. 1, with an outside diameter substantially equal to the inside diameter of the coiled tubing 12b and 14b. This allows the metal body 16b to be flexible and limber in bending so that it might be spoolable and flexibly bent on a reel. A plastic coating 72, such as sold under the trademark "HALAR 200", for example, is bonded to the exterior of the middle of the body 16. The coating 72 has an outside diameter substantially equal to the outside diameter of the coiled tubing 12b and 14b. The coating 72 may abut the ends of the coiled tubing for presenting a smooth exterior over the connector 10b and attached coiled tubing sealing passing through well equipment.

Preferably, a circular compression element 71, an elastomeric member, such as polyurethane is provided at each end of the coating 72. Compression elements 71 are flexible deformable buffer rings which are pliable to absorb the high compressive loads on the interior of the coiled tubing 12b and 14b from the bending stresses when being spooled. The compression elements 71 return to their original shape when the connector 10b is straightened.

The present invention, therefore, is well adapted to carry out the objects and attain the ends and advantages mentioned as well as others inherent therein. While presently preferred embodiments of the invention have been given for the purpose of disclosure, numerous changes in the details of construction, and steps of the methods, will be readily apparent to those skilled in the art and which are encompassed within the spirit of the invention and the scope of the appended claims.

What is claimed is:

1. A well connector connectable to the inside of one end of well coiled tubing for coupling the coiled tubing to another member comprising, a circular body having first and second ends and a bore therethrough and an outside diameter of a size no greater than the outside diameter of the coiled tubing, said first end of the body having an outside diameter substantially equal to the inside diameter of the coiled tubing, seal means on the first end for sealing between the first end and the inside of the one end of the coiled tubing, a mandrel having first and second ends and having a bore therethrough, said first end of the mandrel threadably engaging the inside of the first end of the body, slip means abutting the first end of the body and engaging the outside of the mandrel, said slip means including a plurality of outwardly directed teeth for engaging the inside of the coiled tubing, and coacting wedge surfaces on the inside of the slip means and the outside of the mandrel for wedging the slip means into the inside of the coiled tubing and for holding the mandrel relative to the body when the body is rotated relative to the mandrel.

2. The connector of claim 1 wherein said slip means and said mandrel each includes a longitudinally extending groove for receiving a weld flash located on the interior of the coiled tubing.

3. The connector of claim 1 including connection means on the second end of the body for coupling to said other member.

4. The connector of claim 1 wherein,
the seal means is positioned adjacent the first end of the body.

5. A well connector connectable to the inside of one end of two well coiled tubing for coupling a first coiled tubing to a second coiled tubing, a circular body having first and second ends and having a bore therethrough and an outside diameter of a size no greater than the outside diameter of the coiled tubing, said first end of the body and second end of the body each having an outside diameter substantially equal to the inside diameter of the first and second coiled tubing, respectively seal means on the first end of the body and on the second end of the body for sealing between the first end of the body and the inside of one end of the first coiled tubing and sealing between the second end of the body and the inside of the one end of the second coiled tubing, first and second mandrels each having first and second ends and each having a bore therethrough, the first end of the first mandrel threadably engaging the inside of the first end of the body, and the first end of the second mandrel threadably engaging the inside of the second end of the body, the threadable engagement of the first mandrel with the body being oppositely directed to the threadable engagement of the second mandrel with the second end of the body, first slip means abutting the first end of the body and engaging the outside of the first mandrel, said slip means including a plurality of outwardly directed teeth for engaging the inside of the first coiled tubing, second slip means abutting the second end of the body and engaging the outside of the second mandrel, said second slip including a plurality of outwardly directed teeth for engaging the inside of the second coiled tubing, first coacting wedge surfaces on the inside of the first slip means and the outside of the first mandrel for wedging the first slip means into the inside of the first coiled tubing and for holding the mandrel relative to the body when the body is rotated relative to the first mandrel, and second coacting wedge surfaces on the inside of the second slip means and the outside of the second mandrel for wedging the second slip means into the inside of the second coiled tubing and for holding the mandrel relative to the body when the body is rotated relative to the second mandrel.

6. The connector of claim 5 wherein said first and second slip means and said first and second mandrel each include a longitudinally extending groove for receiving a weld flash located on the interior of the coiled tubing.

7. The connector of claim 5 wherein the first seal means is positioned on the first end of the body in alignment with the threaded engagement of the first mandrel with the first end of the body and the second seal means is positioned on the second of the body in alignment with the threaded connection between the second mandrel and the body.

8. The connector of claim 7 wherein the body includes a reduced outer diameter between the first and second seal means.

9. The connector of claim 5 including,
a plastic outer coat on the middle part of the body having an outside diameter substantially equal to the outer diameter of the coiled tubing and adapted to mate with the one ends of the first and second coiled tubing.

10. The connector of claim 9 including,
a circular compression element around the body at each end of the plastic coat.

11. A well connector connectable to the inside of one end of two well coiled tubings for coupling a first coiled tubing to a second coiled tubing comprising, a circular body having first and second ends and a bore therethrough and an outside diameter of a size no greater than the outside diameter of the coiled tubing, said first and second ends each having an outside diameter substantially equal to the inside diameter of the first and second coiled tubing, respectively, seal means on the first end of the body and on the second end of the body for sealing between the first end of the body and the inside of the one end of the first coiled tubing and sealing between the second end of the body and the inside of the one end of the second coiled tubing, threaded engaging means on the first and second ends of the body for connecting the first and second ends of the body to the inside of the one end of the first coiled tubing and to the inside of the one end of the second coiled tubing, respectively, said threaded engaging means on the first end being oppositely directed to the threaded engaging means on the second end, said thread engaging means including teeth for engaging the inside of the coiled tubing.

12. In a well connector connected to the inside of one end of two well coiled tubings for coupling the first coiled tubing to the second coiled tubing and being coiled around a coil tubing reel, of a circular body having first and second ends and a bore therethrough, seal means on the first end of the body and on the second end of the body for sealing between the first and second coiled tubings, and threaded engagement means on the first and second ends of the body for connecting the first and second ends of the body to the inside of the first and second coiled tubings, respectively, said threaded engaging means on the first end being oppositely directed to the threaded engagement means on the second end, the improvement comprising, said body having an outside diameter of a size no greater than the outside diameter of the coiled tubing and having sufficient flexibility to coil around a coiled tubing reel and resiliently return to its original elongate position when the coiled tubing is unwound from the reel.

* * * * *